(12) United States Patent
Rácz et al.

(10) Patent No.: US 9,107,095 B2
(45) Date of Patent: Aug. 11, 2015

(54) CONGESTION CONTROL FOR MULTI FLOW DATA COMMUNICATION

(71) Applicant: Telefonaktiebolaget LM Ericsson (publ), Stockholm (SE)

(72) Inventors: Sándor Rácz, Cegléd (HU); Szilveszter Nádas, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 252 days.

(21) Appl. No.: 13/700,454

(22) PCT Filed: Nov. 9, 2012

(86) PCT No.: PCT/SE2012/051220
§ 371 (c)(1),
(2) Date: Nov. 28, 2012

(87) PCT Pub. No.: WO2013/070164
PCT Pub. Date: May 16, 2013

(65) Prior Publication Data
US 2014/0056142 A1    Feb. 27, 2014

Related U.S. Application Data

(60) Provisional application No. 61/557,492, filed on Nov. 9, 2011.

(51) Int. Cl.
H04W 28/02    (2009.01)
H04W 28/08    (2009.01)
(Continued)

(52) U.S. Cl.
CPC ........... *H04W 28/0247* (2013.01); *H04L 47/12* (2013.01); *H04L 47/125* (2013.01);
(Continued)

(58) Field of Classification Search
None
See application file for complete search history.

(56) References Cited

U.S. PATENT DOCUMENTS

2004/0071086 A1*  4/2004  Haumont et al. ............. 370/230
2004/0090936 A1   5/2004  Cuny et al.
(Continued)

FOREIGN PATENT DOCUMENTS

WO      04002085 A1    12/2003
WO    2010056158 A1     5/2010

OTHER PUBLICATIONS

3rd Generation Partnership Project. "TCP Performance Evaluation of SF-DC Inter NodeB Aggregation Assuming Realistic RLC, Flow Control and Iub Congestions Control." 3GPP TSG RAN WGI Meeting #66, RI-112686, Aug. 22-26, 2011, pp. 1-10, Athens, Greece.*
Palyi, P.L. et al. "Window-based HSDPA Transport Network Congestion Control." 2010 European Wireless Conference, Conference Publications, Apr. 12-15, 2010, pp. 123-131, Lucca, Italy.*
3rd Generation Partnership Project. 3GPP TR 25.872 V 2.0.0 (Sep. 2011). 3rd Generation Partnership Project; Technical Specification Group Radio Access Network; HSDPA Multipoint Transmission; (Release 11). Sep. 2011, pp. 1-28.
(Continued)

*Primary Examiner* — Chi H Pham
*Assistant Examiner* — Vladislav Agureyev
(74) *Attorney, Agent, or Firm* — Murphy, Bilak & Homiller, PLLC (57) ABSTRACT

In a multi flow HSDPA system comprising a RNC (402) and a plurality of NodeB's (404, 406), the present disclosure includes (re-) use of original active queue management, AQM, based congestion control, ABCC for a primary link (421). For every detected congestion, an end-user IP packet is destroyed. ABCC is not used for the secondary link (422), which means that application level TCP will not be informed about congestion on the secondary link (422). The radio link control, RLC, protocol data units, PDU, (432) are distributed among links based on the congestion status of the links. If secondary link (422) is congested then more packets will be transmitted on the primary link (421). This makes it possible to use TCP compatible congestion control for multi flow HSDPA, without the drawback that would result from TCP reacting unnecessarily on flow bitrate decrease.

13 Claims, 4 Drawing Sheets

(51) Int. Cl.

| | |
|---|---|
| *H04L 12/891* | (2013.01) |
| *H04L 12/803* | (2013.01) |
| *H04W 40/24* | (2009.01) |
| *H04L 12/801* | (2013.01) |
| *H04L 12/823* | (2013.01) |
| *H04L 12/707* | (2013.01) |

(52) U.S. Cl.
CPC .............. *H04L 47/41* (2013.01); *H04W 28/08* (2013.01); *H04W 40/24* (2013.01); *H04L 45/22* (2013.01); *H04L 47/32* (2013.01)

(56) References Cited

U.S. PATENT DOCUMENTS

| | | | |
|---|---|---|---|
| 2006/0149852 A1 | 7/2006 | Schollmeier et al. | |
| 2010/0067383 A1* | 3/2010 | Nagy et al. | 370/236 |
| 2010/0216451 A1* | 8/2010 | De Pasquale et al. | 455/423 |
| 2012/0163161 A1* | 6/2012 | Zhang et al. | 370/216 |
| 2012/0163185 A1* | 6/2012 | Zhang et al. | 370/241 |
| 2012/0163205 A1* | 6/2012 | Zhang et al. | 370/252 |
| 2013/0194924 A1* | 8/2013 | Zhang et al. | 370/232 |

OTHER PUBLICATIONS

Pályi, P.L. et al. "Window-based HSDPA Transport Network Congestion Control." 2010 European Wireless Conference, Conference Publications, Apr. 12-15, 2010, pp. 123-131, Lucca, Italy.

3rd Generation Partnership Project. "Considerations on HSDPA multi-point transmission." 3GPP TSG RAN WG1 Meeting #63bis, R1-110322, Jan. 17-21, 2011, pp. 1-4, Dublin, Ireland.

3rd Generation Partnership Project. "TCP Performance Evaluation of SF-DC Inter NodeB Aggregation Assuming Realistic RLC, Flow Control and Iub Congestions Control." 3GPP TSG RAN WG1 Meeting #66, R1-112686, Aug. 22-26, 2011, pp. 1-10, Athens, Greece.

3rd Generation Partnership Project. "Configuration of HSDPA Multipoint transmission." 3GPP TSG RAN WG1 Meeting #66bis, R1-113344, Oct. 10-14, 2011, pp. 1-2, Zhuhai, China.

3rd Generation Partnership Project. 3GPP TR 25.872 V11.0.0 (Sep. 2011). 3rd Generation Partnership Project; Technical Specification Group Radio Access Network; High Speed Packet Access (HSDPA) multipoint transmission (Release 11). Sep. 2011.

\* cited by examiner

CONGESTION CONTROL FOR MULTI FLOW DATA COMMUNICATION

TECHNICAL FIELD

The present disclosure relates to controlling data flow between entities in a mobile communication system, specifically between a radio network controller, RNC, and multiple NodeB's in a system that is capable of high-speed downlink packet access, HSDPA.

BACKGROUND

The third generation partnership project, 3GPP, is currently working on specifying support for HSDPA flow control, HSDPA FC. The goal of HSDPA FC, is to avoid and/or resolve congestion in a transport network, TN, between RNC and NodeB (i.e. a radio base station, RBS) and to keep enough data packets in the packet queues, PQ, in NodeB while at the same time avoiding unnecessarily long delays in the flow of data in the transport network.

In the prior art there are several ways in which this is done. For example, an early attempt was rate based aggregated flow control. However, this technique has been surpassed by later developments.

Another example is rate based per-flow flow control. When so-called active queue management, AQM, based congestion control, ABCC, is introduced the use of rate based per-flow flow control will remain. One of the reasons is that ABCC cannot support asynchronous transport mode, ATM, based transport networks, whereas rate based per-flow flow control can be used also in ATM based transport networks. Per flow (i.e. per radio bearer) bitrate is calculated based on Iub (the interface between RNC and NodeB) congestion detection and based on the status of the high speed medium access control, MAC-hs, scheduling buffer in the NodeB. The calculated bitrate is signaled from the NodeB to RNC. In the RNC MAC-d shapes the flow according to the received bitrate.

ABCC will be available in parallel with rate based per-flow flow control. This solution is intended to be the mainstream solution when the radio access network, RAN, and the transport network (Iub) is Internet protocol, IP, based. In the future it is expected that communication network operators move towards IP-based transport. Therefore it can be important to support all features with ABCC as it is expected to be a mainstream solution in the future.

ABCC intends to re-use end-to-end transmission control protocol, TCP, for congestion control both over Iub and for buffer control of the MAC-hs (priority queue, PQ, buffer) in the NodeB. This behavior is achieved by destroying end-user IP packets, when Iub congestion happens or when the MAC-hs buffer grows too long. In case of this solution Capacity Allocation Control Frames are either not sent, or even if sent they indicate very large bitrates, most likely larger than the actual bitrate achieved by the radio bearer, RB.

The main idea of multi-point HSDPA is that a user equipment, UE, receives packets from more than one radio cell, i.e. along different links or legs. In this way e.g. the cell edge user's throughput can be improved. For details see, e.g., figure 9.2 in 3GPP TR 25.872.

As mentioned, in ABCC the application level TCP is re-used as TN congestion control and PQ buffer control. Using ABCC for multi-link HSDPA, when congestion occurs on one of the links the TCP congestion avoidance mechanism is triggered and TCP will react on flow bitrate decrease. However, a consequence of this TCP congestion mechanism being triggered is that the UE cannot fully utilize the aggregated capacity of the links.

SUMMARY

In order to mitigate at least some of the drawbacks as discussed above, there is provided in a first aspect of the invention a method in a radio network controller. The radio network controller is configured high speed downlink packet access, HSDPA, multipoint transmission wherein a received flow of data units is transmitted to a user equipment via a primary communication link and a secondary communication link. The primary and secondary communication links comprises a first radio base station and a second radio base station, respectively. The transmission of the data units is distributed between the primary and secondary communication links according to a primary weight and a secondary weight, respectively. The method comprises receiving congestion status information from any of the first and second radio base stations. The congestion status information comprises information that is indicative of congestion of data to be transmitted to the user equipment. The secondary weight is updated based on the received congestion status information such that, if the congestion status information indicates congestion on the primary link, increasing the secondary weight, and if the congestion status information indicates congestion on the secondary link, decreasing the secondary weight. The primary weight is updated such that the primary weight conforms to the updated secondary weight, and the data units are transmitted on the primary and secondary links according to the updated primary and secondary weights, respectively.

In order to mitigate at least some of the drawbacks as discussed above, there is provided in a second aspect of the invention a method in a radio base station. The radio base station is configured for high speed downlink packet access, HSDPA, multipoint operation such that the radio base station is configured to operate in any of a primary communication link and a secondary communication link. A flow of data units is received from a radio network controller, stored in a transmission queue and transmitted to a user equipment. The method comprises detecting congestion of data to be transmitted to the user equipment. Information indicative of the detected congestion is transmitted to the radio network controller. A determination is made whether the radio base station is operating in the primary link or operating in the secondary link, and, if it is determined that the radio base station is operating in the primary link, at least one data unit is removed from the transmission queue.

In order to mitigate at least some of the drawbacks as discussed above, there is provided in a second aspect of the invention a radio network controller. The radio network controller is configurable for high speed downlink packet access, HSDPA, multipoint transmission wherein a flow of data units is transmitted to a user equipment via a primary communication link and a secondary communication link. The primary and secondary communication links comprises a first radio base station and a second radio base station, respectively. The transmission of the data units is distributed between the primary and secondary communication links according to a primary weight and a secondary weight, respectively. The radio network controller comprises digital data processing, memory and communication circuitry adapted to:

receive congestion status information from any of the first and second radio base stations, said congestion status information comprising information that is indicative of congestion of data to be transmitted to the user equipment, update the secondary weight based on the received congestion status information such that, if the congestion status information indicates congestion on the primary link, increasing the secondary weight, and if the congestion status information indicates congestion on the secondary link, decreasing the secondary weight, update the primary weight such that the primary weight conforms to the updated secondary weight, and transmit the data units on the primary and secondary links according to the updated primary and secondary weights, respectively.

In order to mitigate at least some of the drawbacks as discussed above, there is provided in a second aspect of the invention a radio base station. The radio base station is configurable for high speed downlink packet access, HSDPA, multipoint operation such that the radio base station is configured to operate in any of a primary communication link and a secondary communication link. A flow of data units is received from a radio network controller, stored in a transmission queue and transmitted to a user equipment. The radio base station comprises digital data processing, memory and communication circuitry adapted to:

detect congestion of data to be transmitted to the user equipment, transmit, to the radio network controller, information indicative of the detected congestion, determine whether the radio base station is operating in the primary link or operating in the secondary link, and remove, if it is determined that the radio base station is operating in the primary link, at least one data unit from the transmission queue.

In a respective fifth and sixth aspect of the invention there is provided a non-transitory computer program product comprising software instructions that are configured, when executed in a processor, to perform the method of the first and second aspect, respectively.

In other words, in a system comprising a RNC and a plurality of NodeB's, the present disclosure includes (re-) use of the original ABCC for the primary link (i.e. the primary leg). This means that, for every detected congestion, an end-user IP packet is destroyed. ABCC is not used for the secondary link, which means that application level TCP will not be informed about congestion on the secondary link at all. The radio link control, RLC, protocol data unit, PDU, is distributed among legs based on the congestion status of the legs. If secondary leg is congested then more packets will be transmitted on the primary leg. This makes it possible to use TCP compatible congestion control for multi flow HSDPA, without the drawback that would result from TCP reacting on flow bitrate decrease.

DETAILED DESCRIPTION

Figure 1:
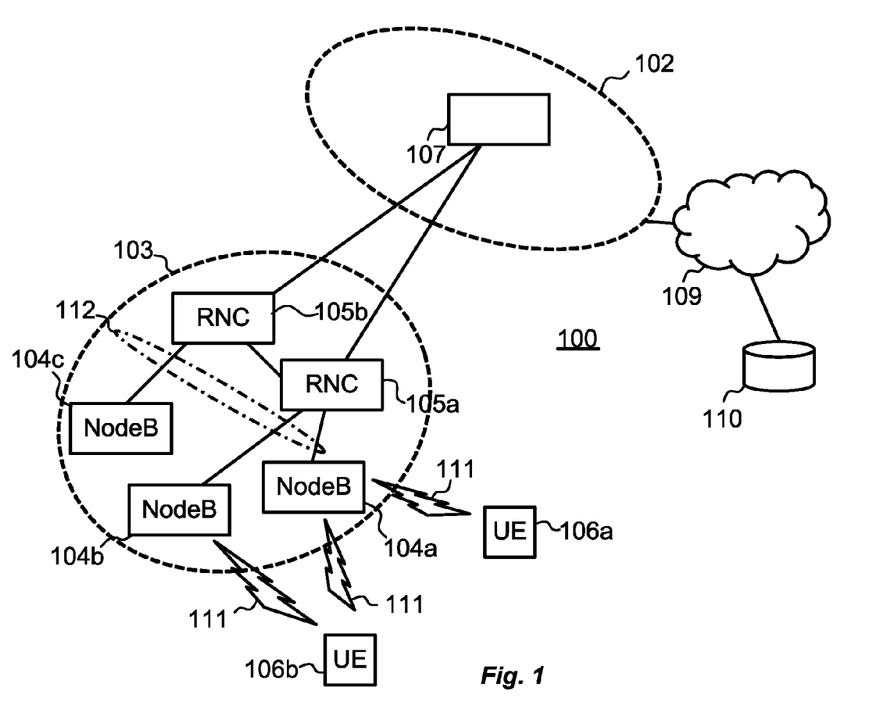
FIG. 1 illustrates schematically a mobile communication system.

FIG. 1 illustrates schematically a mobile communication system in the form of a cellular network 100 in which the present methods and apparatuses can be implemented. The cellular network 100 in FIG. 1 is exemplified by a universal mobile telecommunications system, UMTS. It should be noted, however, that the skilled person will readily be able to perform implementations in other similar communication systems involving transmission of coded data between nodes.

In FIG. 1 the cellular network 100 comprises a core network 102 and a UMTS terrestrial radio access network, UTRAN, 103. The UTRAN 103 comprises a number of nodes in the form of radio network controllers, RNC, 105a, 105b, each of which is coupled via a so-called transport network, TN, 112, to a set of neighbouring nodes in the form of one or more NodeB 104a, 104b, 104c. Each NodeB 104 is responsible for a given geographical radio cell and the controlling RNC 105 is responsible for routing user and signaling data between that NodeB 104 and the core network 102. All of the RNCs 105 are coupled to one another. Signaling between the Node Bs and the RNCs includes signaling according to the Iub interface. A general outline of the UTRAN 103 is given in 3GPP technical specification TS 25.401 V3.2.0.

FIG. 1 also illustrates communicating entities in the form of mobile devices or user equipment, UE, 106a, 106b and radio base stations in the form of NodeBs 104a, 104b, 104c. A first UE 106a communicates with a first NodeB 104a via an air interface 111 and a second UE 106b communicates with the first NodeB 104a and with a second NodeB 104b via the air interface 111. Signaling in the air interface 111 includes signaling according to the Uu interface. As will be elucidated in some detail below, the UEs 106b operates by utilizing MP-HSDPA in relation to the two NodeB's 104a and 104b.

The core network 102 comprises a number of nodes represented by node 107 and provides communication services to the UEs 106 via the UTRAN 103, for example for communication between UEs connected to the UTRAN 103 or other mobile or fixed networks and when communicating with the Internet 109 where, schematically, a server 110 illustrates an entity with which the mobile devices 106 may communicate. As the skilled person realizes, the network 100 in FIG. 1 may comprise a large number of similar functional units in the core network 102 and the UTRAN 103, and in typical realizations of networks, the number of mobile devices may be very large.

Figure 2:
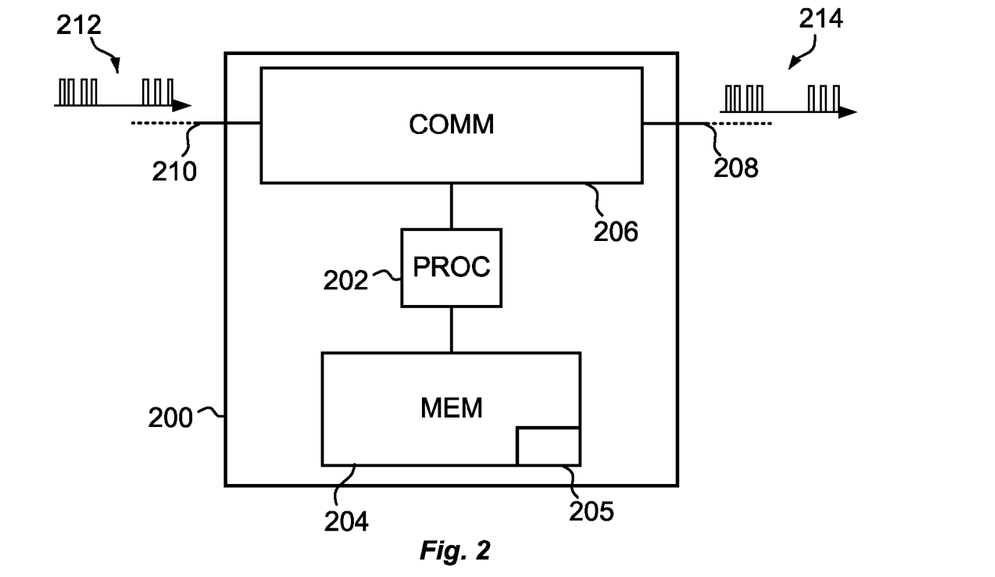
FIG. 2 illustrates schematically a radio network controller.

FIG. 2 is a functional block diagram that schematically illustrates a radio network controller, RNC, 200 that is configured to operate in a radio access network, such as the UTRAN 103 in FIG. 1. In the embodiment of FIG. 2, the RNC 200 represents a RNC, such as any of the RNC's 105 in FIG. 1.

The RNC 200 comprises digital data processing circuitry, memory circuitry and communication circuitry in the form of a processor 202, a memory 204 and communication circuitry 206 that includes a transmitter capable of transmitting data to other entities in the network. For example, the circuitry of these means 202, 204 and 206 can comprise and/or form part of one or more application specific integrated circuit, ASIC, as well as one or more digital signal processor, DSP. The RNC 200 receives data 212 via an incoming data path 210 and transmits data 214 via an outgoing data path 208. The data 210, 212 can be any of uplink and downlink data, as the skilled person will realize.

Methods to be described below can be implemented in the RNC 200. In such embodiments, the method actions are realized by means of software instructions 205 that are stored in the memory 204 and are executable by the processor 202. Such software instructions 205 can be realized and provided to the RNC 200 in any suitable way, e.g. provided via the networks 102, 103 or being installed during manufacturing, as the skilled person will realize. Moreover, the memory 204, the processor 202, as well as the communication circuitry 206 comprise software and/or firmware that, in addition to being configured such that it is capable of implementing the methods to be described, is configured to control the general operation of the RNC 200 when operating in a communication system such as the system 100 in FIG. 1. However, for the purpose of avoiding unnecessary detail, no further description will be made in the present disclosure regarding this general operation.

Figure 3:
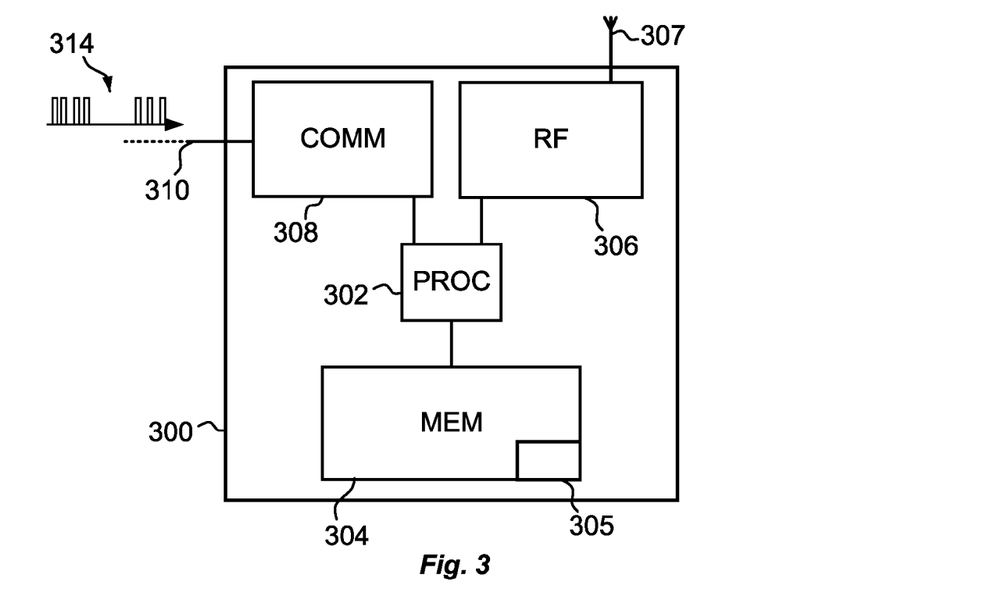
FIG. 3 illustrates schematically a radio base station.

FIG. 3 is a functional block diagram that schematically illustrates a radio base station, RBS, in the form of a Node B 300, corresponding to any of the Node Bs 106 in FIG. 1. The Node B 300 comprises digital data processing circuitry, memory circuitry and communication circuitry in the form of a processor 302, a memory 304, radio frequency, RF, receiving and transmitting circuitry 306 and an antenna 307. Communication circuitry 308 includes a receiver capable of receiving data from other entities in the network. Radio communication via the antenna 307 is realized by the RF circuitry 306 controlled by the processor 302, as the skilled person will understand. The circuitry of these means 302, 304, 306 and 308 can comprise and/or form part of one or more application specific integrated circuit, ASIC, as well as one or more digital signal processor, DSP. The processor 302 makes use of software instructions 305 stored in the memory 304 in order to control functions of the Node B 300, including the functions to be described in detail below with regard to handling of PDUs. In other words, at least the communication circuitry 308, RF circuitry 306, the processor 302 and the memory 304 form parts of processing and communication circuitry that is configured to handle data as summarized above and described in detail below. Further details regarding how these units operate in order to perform normal functions within a communication system, such as the system 100 of FIG. 1, are outside the scope of the present disclosure and are therefore not discussed further.

Figure 4:
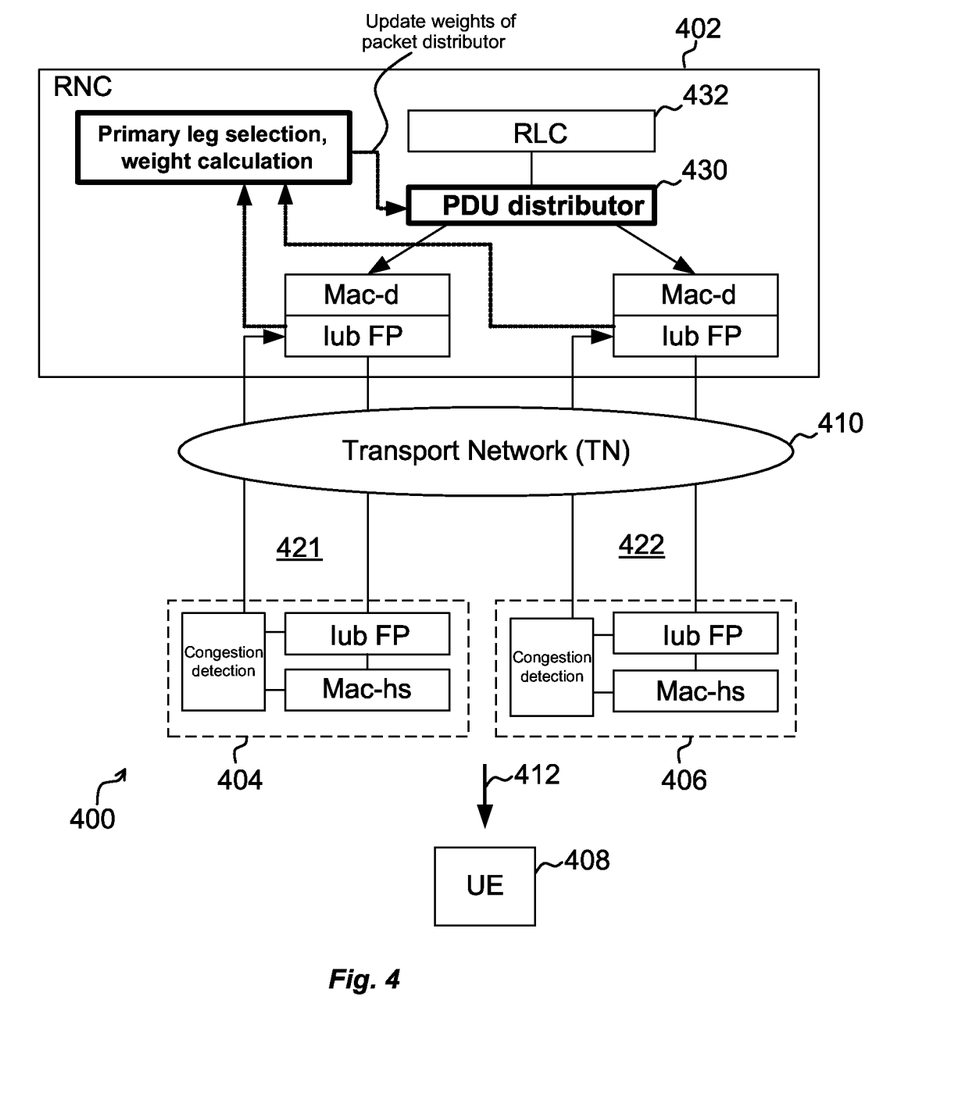
FIG. 4 illustrates schematically a mobile communication system.
Figure 5:
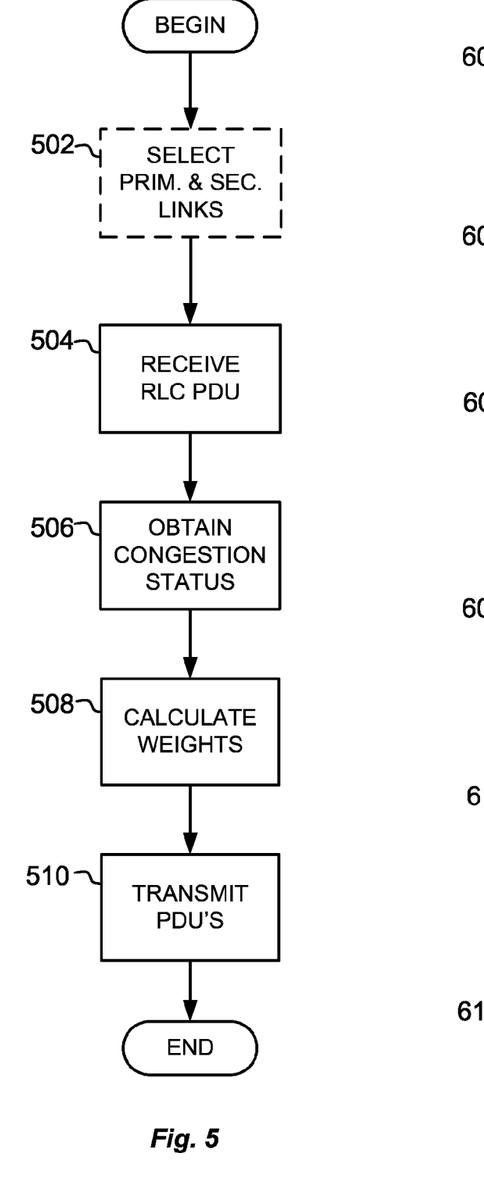
FIGS. 5 and 6 are flow charts of methods.
Figure 6:
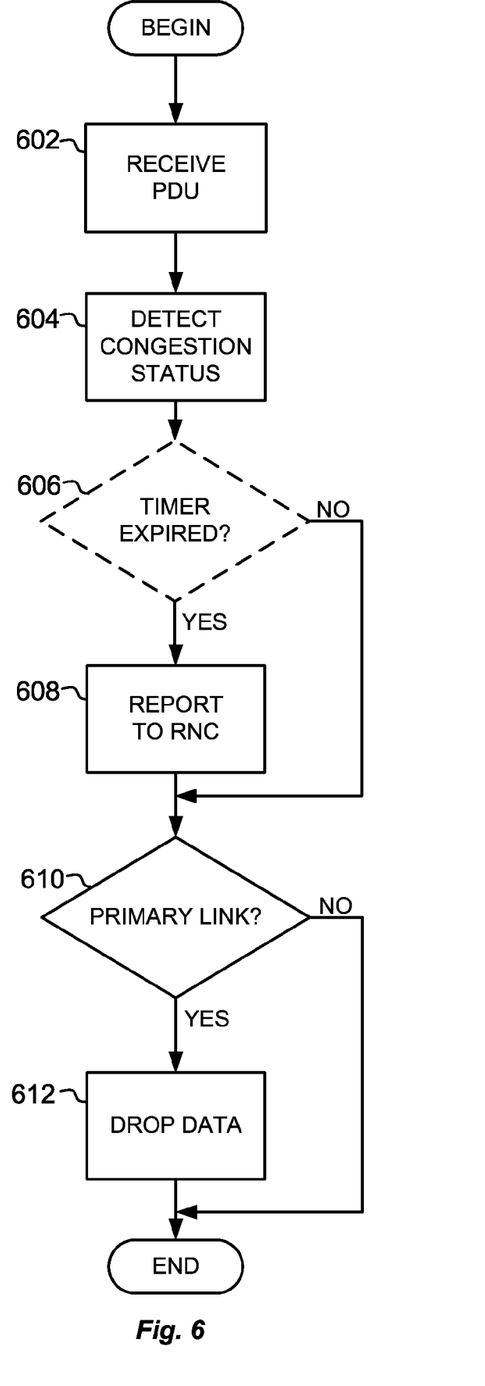

Turning now to FIGS. 4, 5 and 6, and with continued reference to the previous figures, examples of methods and arrangements associated with congestion will be described in some more detail. FIG. 4 is a block diagram of a system 400 comprising a radio network controller, RNC, 402 connected via a respective link, or leg, 421, 422 of a transport network 410 to a first radio base station, RBS, or Node B, 404 and a second RBS, or Node B, 406. In the following, link 421 will be denoted a primary link and link 422 will be denoted a secondary link. However, any of the links 421, 422 can operate as the primary link as well as the secondary link, as the skilled person realizes. The RNC 402 and the Node Bs 404, 406 can correspond to any of the RNCs 105, 200 and Node Bs 104, 300 described above in connection with FIGS. 1 to 3.

The RNC 402 is configured for HSDPA multipoint transmission wherein a received flow of data units is transmitted to a user equipment 408 via the primary communication link 421 and the secondary communication link 422, comprising the respective first radio base station 404 and the second radio base station 406, respectively. The transmission of the data units is distributed between the primary and secondary communication links 421, 422 according to a primary weight and a secondary weight, respectively. The actual selection of the primary communication link 421 can be made, in a selection step 502, from a plurality of communication links. Even though only two links are illustrated, the skilled person will realize that in a typical system implementation, the number of radio base stations (and thereby the number of links) is much higher than two. The selection can be performed based on measurements of data transmission bitrates of the plurality of communication links, such that selecting the primary communication link as a communication link having a measured data transmission bitrate that is the highest of the data transmission bitrates of the plurality of communication links. Similarly, selection of the secondary communication link can be of any communication link among the plurality of communication links that has a measured data transmission bitrate that is lower than the transmission bitrate of the primary communication link. Alternatively, selection of the secondary link can be performed such that, at a current point in time, it is selected among a plurality of communication links, into which plurality of communication links said secondary communication link has been added subsequent to a point in time when the primary communication link was selected.

The flow of data units, for example in the form of data in RLC PDUs, is received in a reception step 504. Congestion status information is obtained by reception, in a reception step 506, from any of the first and second radio base stations 404, 406, the congestion status information comprising information that is indicative of congestion of data to be transmitted to the user equipment 408. The secondary weight is updated, by calculation in a calculation step 508, based on the received congestion status information. This calculation is performed such that, if the congestion status information indicates congestion on the primary link, the secondary weight is increased, and if the congestion status information indicates congestion on the secondary link, the secondary weight is decreased. The primary weight is also updated in the calculation step 508 such that the primary weight conforms to the updated secondary weight. As will be described in more detail below, this conditional increase of the secondary weight comprises doubling the secondary weight and the conditional decrease of the secondary weight can comprise halving the secondary weight. The data units are transmitted, in a transmission step 510, on the primary and secondary links according to the updated primary and secondary weights, respectively.

It is to be noted that the selection step 510 can be considered as an optional step of the method in FIG. 5. That is, returning to FIG. 5, an example of a method in a RNC that communicates with a NodeB, such as any of the RNCs and NodeB's in FIGS. 1 to 4 can comprise the following steps: a reception step 504 in which one or more RLC PDU is received. In an obtaining step 506, the congestion status of at least one of the primary and the secondary leg is obtained from the NodeB. In a calculation step 508, weights are calculated, e.g. as described above, and in a transmission step 510, the RLC PDU's are transmitted on the primary leg and the secondary leg, distributed according to the weights calculated in the calculation step 508.

It is to be noted that, even though the flow chart in FIG. 5 illustrates a sequence of operations, the skilled person will realize that one or more of the steps can be performed more or less in parallel.

The method in a radio base station or Node B is illustrated in FIG. 6. The radio base station is configured for HSDPA multipoint operation such that the radio base station is configured to operate in any of a primary communication link and a secondary communication link. That is, the method in the radio base station can operate together with the method in the radio network controller via the primary and secondary links 421, 422 as described above. A flow of data units, e.g. RLC PDUs, is received from a radio network controller in a reception step 602. The received data units are stored in a transmission queue and transmitted to the user equipment 408. Congestion of data to be transmitted to the user equipment is detected in a congestion status detection step 604. Information indicative of the detected congestion is then reported, by transmission in a reporting step 608, to the radio network controller. This reporting 608 can, in some embodiments, be delayed by the use of a timer. That is, the method can comprise activation of a timer, and wherein the transmission of the information indicative of the detected congestion is conditioned on the timer such that the transmission takes place only if the timer has expired, as illustrated by a timer checking step 606. A determination is made, in a checking step 610, whether the radio base station is operating in the primary link or operating in the secondary link. If it is determined, in the checking step 610, that the radio base station is operating in the primary link, at least one data unit is removed from the transmission queue in a drop data step 612.

It is to be noted that the timer checking 606 can be considered as an optional step of the method in FIG. 6. That is, returning to FIG. 6, an example of a method in a NodeB that communicates with a RNC, such as any of the NodeB's and RNC's in FIGS. 1 to 4, can comprise the following steps: a reception step 602 in which one or more PDU is received from the RNC via a transport network. In a detection step 604 data congestion is detected and a congestion status determined. The congestion status is reported to the RNC in a reporting step 608. Depending on whether the NodeB is in the primary leg or in the secondary leg, as indicated with a decision step 610, end-user data is destroyed in a drop data step 612 when congestion is detected. If the NodeB is in the secondary leg, no drop of data takes place.

It is to be noted that, even though the flow chart in FIG. 6 illustrates a sequence of operations, the skilled person will realize that one or more of the steps can be performed more or less in parallel.

Returning now to FIG. 4, which shows an example of an architecture for a mobile communication system 400, the examples presented in FIGS. 1 to 3 and 5-6 will be exemplified in even more detail. It is to be noted that, as the skilled person will realize, the system 400 can comprise many more communicating entities, all of which have been omitted from FIG. 1 for the sake of clarity. The system 400 comprises an RNC 402 that is connected to two NodeB's 404, 406 via a transport network 410 using the Iub interface. As FIG. 4 shows, RLC PDUs are transmitted over more than one leg, i.e. links 421, 422, via the NodeB's 404, 406 towards a UE 408 via an air interface 412 and in this way the UE 408 can achieve higher RLC level bitrate. The RNC 402 comprises a PDU distributor 430 that distributes the RLC PDUs among the legs based on weights. The weights of the legs are updated according to the congestion status of the legs. Primary leg selection is also done in the RNC. For the primary leg ABCC is used, but for the secondary legs ABCC is not used. It is to be noted, as mentioned above, that any of the links 421, 422 can operate as the primary link as well as the secondary link, as the skilled person realizes.

In the NodeB's 404, 406 congestion detection is executed. The RNC 402 is informed of congestion using Iub frame protocol, FP, control frame.

Now, in some more detail, the PDU distributor 430 will be described. To support multi-link feature for ABCC an extra functionality in the form the PDU distributor 430 is included in the RNC 402 to decide on which leg 421, 422 to send a given RLC PDU 432. Based on the behaviour of ABCC the following requirements are identified regarding a distribution algorithm in the PDU distributor 430. In the following, the link 421 will be denoted the primary link (or leg) and the link 422 will be denoted the secondary link (or leg).

In case of transport network 410 limitation, i.e. between the RNC 402 and the Node Bs 404, 406, the primary leg 421 shall be TCP compatible; therefore the ABCC is kept for the primary leg 421. The secondary leg 422 shall be more or less TCP compatible; preferably somewhat less aggressive than TCP (Less aggressive meaning that when a TCP flow and a less aggressive than TCP flow shares a common bottleneck the less aggressive flow gets smaller throughput (when all other conditions of the flows are the same).

In case of air interface 412 limitation, the ABCC behaviour is kept in the primary leg 421. For the secondary leg 422, a reasonable buffer is provided in the second node B 406 and the primary leg 421 is not destroyed.

The existing ABCC algorithm in the NodeB, such as any of the NodeB's 404, 406 in FIG. 4, can be kept on the primary leg 421, while on the secondary leg 422 end-user PDUs are never dropped. Congestion events on the secondary leg 422 shall result in weight change only between the primary and secondary legs.

An example of a weight calculation method can be expressed using the following pseudo-code:

```
Initialize Weight_secondary to 10%
IF congestion is detected on secondary leg THEN
    Weight_secondary = Weight_secondary/2
ELSE IF congestion is detected on primary leg THEN
    Weight_secondary = Weight_secondary*2
END IF
```

On the primary leg 421 when congestion is detected an end-user PDU is also destroyed in the first NodeB 404.

As congestion is detected in a NodeB 404, 406 and the distribution algorithm is in the RNC 402, congestion has to be signaled to the RNC 402. Different timers can be applied to prohibit the changing of the weight and to minimize the NodeB to RNC signaling.

The distribution algorithm in the RNC 402 distributes the RLC PDUs 432 among legs according to the weights. For example there are two legs and the Weight_secondary=10%, then 90% of the RLC PDUs are transmitted over the primary leg 421 and the remaining 10% over the secondary leg 422.

The primary leg 421 can be selected based on bitrate measurement (e.g taking the best leg as primary leg) and/or newly attached legs are considered as secondary leg.

On the primary leg 421 the main effect of the congestion control will be the end-to-end TCP congestion control. Whenever a congestion event happens on the primary leg 421 an end-user PDU is dropped. This will result in decreasing, e.g. halving, the end-user TCP congestion window. This also results in increasing, e.g. doubling, the weight for the secondary leg 422. As the TCP congestion window is decreased, e.g. halved, the effective window size on the secondary leg 422 remains unchanged.

Congestion on the secondary leg 422 will result in decreasing, e.g. halving, the weight of the secondary leg 422. This will result in decreasing, e.g. halving, the effective TCP congestion window in the secondary leg 422. As a consequence, the effective TCP congestion window on the primary leg 421 will be somewhat increased.

As used herein, the terms "comprise", "comprising", "comprises", "include", "including", "includes", "have", "has", "having", or variants thereof are open-ended, and include one or more stated features, integers, nodes, steps, components or functions but do not preclude the presence or addition of one or more other features, integers, nodes, steps, components, functions or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Other network elements, communication devices and/or methods according to embodiments of the invention will be or become apparent to one with skill in the art upon review of the present drawings and description. It is intended that all such additional network elements, devices, and/or methods be included within this description, be within the scope of the claims. Moreover, it is intended that all embodiments disclosed herein can be implemented separately or combined in any way and/or combination.

The invention claimed is:

1. A method in a radio network controller configured for high speed downlink packet access (HSDPA) multipoint transmission wherein a received flow of data units is transmitted to a user equipment via a primary communication link and a secondary communication link, said primary and secondary communication links comprising a first radio base station and a second radio base station, respectively, and wherein the transmission of the data units is distributed between the primary and secondary communication links according to a primary weight and a secondary weight, respectively, the method comprising:
  receiving congestion status information from any of the first and second radio base stations, said congestion status information comprising information that is indicative of congestion of data to be transmitted to the user equipment;
  updating the secondary weight based on the received congestion status information by increasing the secondary weight if the congestion status information indicates congestion on the primary link and decreasing the secondary weight if the congestion status information indicates congestion on the secondary link;
  updating the primary weight such that the primary weight conforms to the updated secondary weight; and
  transmitting data units on the primary and secondary links according to the updated primary and secondary weights, respectively.

2. The method of claim 1, wherein said increasing of the secondary weight comprises doubling the secondary weight and wherein said decreasing of the secondary weight comprises halving the secondary weight.

3. The method of claim 1, further comprising selecting said primary communication link from among a plurality of communication links, wherein the selection is performed based on measurements of data transmission bitrates of the plurality of communication links, such that the selected primary communication link is a communication link having a measured data transmission bitrate that is the highest of the data transmission bitrates of the plurality of communication links.

4. The method of claim 1, further comprising selecting said secondary communication link from among a plurality of communication links, wherein the selection is performed based on measurements of data transmission bitrates of the plurality of communication links, such that the selected secondary communication link is any communication link among said plurality of communication links that has a measured data transmission bitrate that is lower than the transmission bitrate of the primary communication link.

5. The method of claim 1, comprising:
  selecting, at a current point in time, said secondary communication link from among a plurality of communication links, into which plurality of communication links said secondary communication link has been added subsequent to a point in time when the primary communication link was selected.

6. The method of claim 1, wherein the data units are radio link control (RLC) protocol data units (PDU).

7. A method in a radio base station configured for high speed downlink packet access (HSDPA) multipoint operation such that the radio base station is configured to operate in any of a primary communication link and a secondary communication link, wherein a flow of data units is received from a radio network controller and stored in a transmission queue for transmission to a user equipment, the method comprising:
  detecting congestion of data to be transmitted to the user equipment;

transmitting, to the radio network controller, information indicative of the detected congestion;

determining whether the radio base station is operating in the primary link or operating in the secondary link; and removing, if it is determined that the radio base station is operating in the primary link, at least one data unit from the transmission queue, so that the at least one data unit is not transmitted to the user equipment.

8. The method of claim 7, further comprising activating a timer, wherein the transmission of the information indicative of the detected congestion is conditioned on the timer such that the transmission takes place only if the timer has expired.

9. The method of claim 7, wherein the data units are radio link control (RLC) protocol data units (PDU).

10. A radio network controller configurable for high speed downlink packet access (HSDPA) multipoint transmission wherein a flow of data units is transmitted to a user equipment via a primary communication link and a secondary communication link, said primary and secondary communication links comprising a first radio base station and a second radio base station, respectively, wherein the transmission of the data units is distributed between the primary and secondary communication links according to a primary weight and a secondary weight, respectively, the radio network controller comprising digital data processing, memory and communication circuitry adapted to:

receive congestion status information from any of the first and second radio base stations, said congestion status information comprising information that is indicative of congestion of data to be transmitted to the user equipment;

update the secondary weight based on the received congestion status information by increasing the secondary weight if the congestion status information indicates congestion on the primary link and decreasing the secondary weight if the congestion status information indicates congestion on the secondary link;

update the primary weight such that the primary weight conforms to the updated secondary weight; and transmit data units on the primary and secondary links according to the updated primary and secondary weights, respectively.

11. The radio network controller of claim 10, where the digital data communication and processing circuitry comprises one or more processors, Application Specific Integrated Circuits, Digital Signal Processors, or combinations thereof.

12. A radio base station configurable for high speed downlink packet access (HSDPA) multipoint operation such that the radio base station is configured to operate in any of a primary communication link and a secondary communication link, wherein a flow of data units is received from a radio network controller and stored in a transmission queue for transmission to a user equipment, the radio base station comprising digital data processing, memory and communication circuitry adapted to:

detect congestion of data to be transmitted to the user equipment;

transmit, to the radio network controller, information indicative of the detected congestion;

determine whether the radio base station is operating in the primary link or operating in the secondary link; and remove, if it is determined that the radio base station is operating in the primary link, at least one data unit from the transmission queue, so that the at least one data unit is not transmitted to the user equipment.

13. The radio base station of claim 12, where the digital data communication and processing circuitry comprises one or more processors, Application Specific Integrated Circuits, Digital Signal Processors, or combinations thereof.

* * * * *